United States Patent
John et al.

(10) Patent No.: US 8,484,247 B2
(45) Date of Patent: Jul. 9, 2013

(54) SYSTEM AND METHOD OF SECURING AND AUTHORIZING MULTIDIMENSIONAL TRANSACTIONAL DATA

(75) Inventors: Peter John, Heidelberg (DE); Erich Marschall, Nussloch (DE)

(73) Assignee: SAP AG, Walldorf (DE)

( * ) Notice: Subject to any disclaimer, the term of this patent is extended or adjusted under 35 U.S.C. 154(b) by 602 days.

(21) Appl. No.: 12/345,930

(22) Filed: Dec. 30, 2008

(65) Prior Publication Data
US 2010/0169268 A1 Jul. 1, 2010

(51) Int. Cl.
*G06F 17/30* (2006.01)
(52) U.S. Cl.
USPC .......................... 707/783; 707/600; 707/781
(58) Field of Classification Search
USPC .......................... 707/600, 781, 783
See application file for complete search history.

(56) References Cited

U.S. PATENT DOCUMENTS

| | | | |
|---|---|---|---|
| 5,706,495 A * | 1/1998 | Chadha et al. | 1/1 |
| 2002/0087686 A1* | 7/2002 | Cronk | 709/225 |
| 2003/0177025 A1* | 9/2003 | Curkendall et al. | 705/1 |
| 2004/0088232 A1* | 5/2004 | Minnis, Jr. | 705/30 |
| 2004/0236655 A1* | 11/2004 | Scumniotales et al. | 705/36 |
| 2004/0260876 A1* | 12/2004 | Singh et al. | 711/117 |
| 2005/0257066 A1* | 11/2005 | John et al. | 713/182 |
| 2006/0259954 A1* | 11/2006 | Patrick | 726/2 |
| 2007/0030528 A1* | 2/2007 | Quaeler et al. | 358/453 |
| 2008/0021732 A1* | 1/2008 | Richards et al. | 705/2 |
| 2008/0040603 A1* | 2/2008 | Stedron | 713/166 |
| 2009/0063490 A1* | 3/2009 | Fuerst et al. | 707/9 |
| 2009/0164878 A1* | 6/2009 | Cottrille | 715/210 |

OTHER PUBLICATIONS

Article entiled "Authorizations for BI Reporting" by Darji, Copyright 2006.*
Article entitled "The New SAP NetWeaver BI Analysis Authorizations" by Lo, Mar. 29, 2006.*
U.S. Appl. No. 12/347,729, filed Dec. 31, 2008, Peter John et al.

* cited by examiner

*Primary Examiner* — Mahesh Dwivedi
(74) *Attorney, Agent, or Firm* — Fountainhead Law Group PC (57) ABSTRACT

In one embodiment the present invention includes a system for securing and authorizing access to multidimensional transactional data. The system includes online analytical processing (OLAP) system and a database system. The OLAP system accesses a selection of multidimensional transactional data from the database system according to a multidimensional request. The OLAP system aggregates the selection to form aggregated information. The OLAP system filters the selection according to the authorization for the user, to form a filtered selection. In this manner the user can see accurate aggregations yet not see unauthorized data.

15 Claims, 3 Drawing Sheets

SYSTEM AND METHOD OF SECURING AND AUTHORIZING MULTIDIMENSIONAL TRANSACTIONAL DATA

CROSS REFERENCE TO RELATED APPLICATIONS

Not Applicable.

BACKGROUND

The present invention relates to online analytical processing (OLAP) systems, and in particular, to OLAP systems that efficiently secure and authorize multidimensional transactional data.

Unless otherwise indicated herein, the approaches described in this section are not prior art to the claims in this application and are not admitted to be prior art by inclusion in this section.

In authorization concepts for securing transactional data in multidimensional repositories, the transactional data is restricted from being accessed via multidimensional ordering criteria (master data). An example of this can be seen in U.S. Patent Application Pub. No. 2005/0257066. Access may be attempted by online analytical processor (OLAP) devices (e.g., implemented by application servers) when accessing data in databases (e.g., implemented by database servers). There are two general paradigms in the treatment of authorizations (or restrictions) of certain combinations of authorizations: a "filter" paradigm and a "barrier" paradigm.

In the filter paradigm, data is filtered before being processed for display. For example, the OLAP system sends a request for data to the database system, and the request includes information regarding the requesting user. The database system uses authorization data to execute a filter on the data before providing the filtered data to the OLAP system. If the user is authorized to access particular data by the authorization data, then the data provided to the OLAP system includes only that particular data; all other data is not provided to the OLAP system.

In the barrier paradigm, the selection set (piece of data) that will be loaded from the database is checked as a whole before it is actually loaded. The answer may be "yes" or "no" and depending on that, the data is processed or not. If not, a message is sent indicating "no authorizations". For example, an authorization barrier system may be implemented between the OLAP system and the database system. Upon an access request by the OLAP system, the authorization barrier system checks whether the user is authorized to access all the data requested. If so, then all data requested is provided, but if not, no data is provided.

TABLE 1 provides and example that illustrates data and authorizations. TABLE 1 shows "2-dimensional" data available for "Material" and "Customer" and as key figure its "Revenue". The term "transactional data" refers to the numbers (e.g. 100$ revenue). A single piece of transactional data may be referred to as an "element". The term "master data" refers to the names of the customers and the type of the material.

TABLE 1

| Customer | Material | Revenue |
| --- | --- | --- |
| Aron | Antibiotic | 100$ |
| Bush | Antibiotic | 50$ |
| Bush | Brush | 20$ |

TABLE 1-continued

| Customer | Material | Revenue |
| --- | --- | --- |
| Decker | Brush | 200$ |
| Miller | Desk | 400$ |
| Norman | Desk | 500$ |
| Norman | Table | 200$ |
| Aron | Table | 123$ |
| Aron | Desk | 456$ |

Note that all customers may have bought all materials, but in practice, of course many customers may have bought some materials but not all. So, even if there are 100 customers and 50 materials there may be less than 100×50=5000 combinations but the maximum may be 5000 data sets.

Assume that a user is reporting on this revenue data and sending a query (to get a report) to the multidimensional query system (e.g., an OLAP system). Further assume that the user is restricted to a couple of combinations (subsets). He is authorized to access Customers between Aron and Decker for Materials between Antibiotic and Brush, and is authorized to access Materials between Desk and Table for Customers Miller and Norman. So he may see the revenue data from Bush who bought a Brush but not the revenue which was created by Aron who bought a Desk.

Note that the transactional data (the "numbers" or key figures) is protected, and not the names for material or users or the combinations themselves. (Such may be referred to as "master data protection", which is not the task of an OLAP engine). So the terminology "access to" refers to access to the key figures that are "labeled" or categorized by the combinations of master data values ("names" for user and material).

TABLE 2

TABLE 2 describes the above authorizations as two interval combinations:

| | Customer | Material |
| --- | --- | --- |
| Authorization1 | [Aron, Decker] | [Antibiotic, Brush] |
| Authorization2 | [Miller, Norman] | [Desk, Table] |

Given the data in TABLE 1 and the authorizations of TABLE 2, reports may be generated according to the two paradigms, as described below.

The first report is a drilldown of Customer and Material, with a sum for each Customer and a Total Sum. TABLE 3 shows the case where the user has full authorization and thus shows all the data:

TABLE 3

| Customer | Material | Revenue |
| --- | --- | --- |
| Aron | Antibiotic | 100$ |
| | Table | 123$ |
| | Desk | 456$ |
| Sum | | 679$ |
| Bush | Antibiotic | 50$ |
| | Brush | 20$ |
| Sum | | 70$ |
| Decker | Brush | 200$ |
| Sum | | 200$ |
| Miller | Desk | 400$ |
| Sum | | 400$ |
| Norman | Desk | 500$ |

TABLE 3-continued

| Customer | Material | Revenue |
|---|---|---|
| | Table | 200$ |
| Sum | | 700$ |
| Total | | 2049$ |

Under the filter paradigm using the authorizations of TABLE 2, a report according to TABLE 4 may result:

TABLE 4

| Customer | Material | Revenue |
|---|---|---|
| Aron | Antibiotic | 100$ |
| Sum | | 100$ |
| Bush | Antibiotic | 50$ |
| | Brush | 20$ |
| Sum | | 70$ |
| Decker | Brush | 200$ |
| Sum | | 200$ |
| Miller | Desk | 400$ |
| Sum | | 400$ |
| Norman | Desk | 500$ |
| | Table | 200$ |
| Sum | | 700$ |
| Total | | 1470$ |

As discussed above, in the filter paradigm the system loads all available data and before displaying it to a restricted user, it filters out (quits) all data sets that are not authorized. The result is shown in TABLE 4. Note that only those data sets that are authorized are displayed. The missing data is (Aron, Table, 123$) and (Aron, Desk, 456$) as it was filtered out. Further note that the total differs (1470$ versus 2049$).

The filter paradigm is easy to define and the user sees always data, maybe less than expected, but never "no authorization".

One disadvantage of the filter paradigm is with many data sets like millions or even hundreds of million of data sets this becomes very slow as all data has to be loaded (and touched) to be quit in the result set. This is usually done on the database before loading data into the system, but still all data has to be analyzed in the SQL (structured query language) execution.

Another disadvantage of the filter paradigm is that the data is user dependent. For example, if User 1 is authorized according to TABLE 2 and User 2 is fully authorized, User 1 sees 1470$ total revenue whereas User 2 sees 2049$. As a more extreme example, revenue for Europe may be 100 million for User 1, and 120 million for User 2, because data rows with collected 20 million revenue have been filtered out.

Under the barrier paradigm using the authorizations of TABLE 2, no report will result. Without any further restriction in the query definition, using the authorization restrictions of TABLE 2 results that the access is not granted, usually with a message like "no authorization". The reason is that the report selects all Materials and all users without restriction which we have not taken into account. But not everything is authorized as can be seen in the authorizations (TABLE 2).

An alternative is to restrict the query (or the report) by an additional selection restriction, but it already becomes difficult to define the two 2-dimensional authorizations as restrictions (since they are not concave, i.e. no rectangle).

Thus, according to the barrier paradigm, a number or key figure is either visible or not, but it does not depend on the user. Returning to the extreme example above (Revenue for Europe), if the authorization for two users is such that they both receive data (i.e., the error message "no authorization" does not occur), the summary values displayed are the same for both users viewing the report, even if their specific authorizations differ.

One disadvantage of the barrier paradigm is that since the interval combination of the example (TABLE 2) does not authorize the combinations of Aron-Decker and Desk-Table, restricting the query (or the report) by an additional selection restriction is an extremely difficult task and usually leads always to an answer "no authorization".

TABLE 5 shows the format (i.e., it includes no data) of a second type of example report. It shows a view with Customer in x-direction and Material in y-direction, giving a table with revenue numbers for the corresponding cells:

TABLE 5

| | Customer | | | | |
|---|---|---|---|---|---|
| Material | Aron | Bush | Decker | Miller | Norman |
| Antibiotic | | | | | |
| Brush | | | | | |
| Desk | | | | | |
| Table | | | | | |

How is this handled according to the existing paradigms and how are the cells filled?

In the filter paradigm, the report depends upon the implementation; one example is TABLE 6 (using the data from TABLE 1 and the authorization from TABLE 2):

TABLE 6

| | Customer | | | | | |
|---|---|---|---|---|---|---|
| Material | Aron | Bush | Decker | Miller | Norman | SUM |
| Antibiotic | 100$ | 50$ | | | | 150$ |
| Brush | | 20$ | 200$ | | | 220$ |
| Desk | | | | 400$ | 500$ | 900$ |
| Table | | | | | 200$ | 200$ |
| SUM | 100$ | 70$ | 200$ | 400$ | 700$ | 1470$ |

The cells without data may be empty (as shown in TABLE 6). Notice that the "emptiness" of the cells has different reasons for different cells. Brush/Aron for instance is empty as it is not booked. Table/Aron is not authorized (see TABLE 2) but may booked. This information is not shown to the user. Thus in the filter paradigm it is not possible at all to distinguish between these two reasons for an empty cell. So data may be missing (no data consistency) or not booked or not authorized. If there is another (invisible) dimension, say color, and User 1 has not authorized "blue", but User 2 does have authorized "blue", then the numbers may even differ, depending upon whether User 1 or User 2 looks at them.

In the barrier paradigm, the usual result is "no authorization" and no data is displayed at all. As discussed above regarding the first example report, it is difficult to craft additional selection restrictions such that data results. Most selections are not restricted to the authorized "area" and thus result in "no authorization".

As another example, consider a third report that includes only Customer in Drilldown with an aggregation (sum) over Material. TABLE 7 gives an example of the third type of report using the data from TABLE 1 assuming all authorizations have been granted:

TABLE 7

| Customer | Revenue |
|---|---|
| Aron | 679$ |
| Bush | 70$ |
| Decker | 200$ |
| Miller | 400$ |
| Norman | 700$ |
| SUM | 2049$ |

In the filter paradigm, TABLE 8 shows the third report (e.g., format similar to TABLE 7) generated according to the data of TABLE 1 and the authorizations of TABLE 2:

TABLE 8

| Customer | Revenue |
|---|---|
| Aron | 100$ |
| Bush | 70$ |
| Decker | 200$ |
| Miller | 400$ |
| Norman | 700$ |
| SUM | 1470$ |

The revenue numbers are user dependent: they depend on what the user has authorized. As a specific example, some of the revenue for Customer Aron (123$ and 456$, see TABLE 1) is not displayed due to the authorizations (TABLE 2). The revenue is summed over only the authorized values, contradicting transparency or data consistency requirements. The revenue that Customer Aron caused thus depends on the user looking at it. It is not apparent from the report which partial revenues have contributed or even that the displayed revenue sum may not be complete or accurate.

In the barrier paradigm, as with the second report, the usual result is "no authorization" and no data is displayed at all.

SUMMARY

Embodiments of the present invention improve systems for securing and authorizing multidimensional transactional data. In one embodiment the present invention includes a system for securing and authorizing access to multidimensional transactional data includes an online analytical processing (OLAP) system and a database system. The OLAP system implements an OLAP application computer program for accessing the multidimensional transactional data. The OLAP system includes a storage system and a processor system. The storage system stores authorization information. The authorization information defines an authorization for a user. The processor system executes the OLAP application computer program. The database system implements a database that stores the multidimensional transactional data. The OLAP application computer program controls the OLAP system to access a selection of the multidimensional transactional data from the database system according to a multidimensional request from the user. The OLAP system further aggregates the selection of the multidimensional transactional data according to the multidimensional request, to form aggregated information. The OLAP system further filters the selection of the multidimensional transactional data according to the authorization for the user, to form a filtered selection. The OLAP system further provides to the user the filtered selection and the aggregated information.

According to an embodiment, a method controls a system for securing and authorizing multidimensional transactional data. The method may include the actions described above.

According to an embodiment, a computer program controls a system for securing and authorizing multidimensional transactional data. The computer program may control the system to perform the actions described above.

In this manner the user can see accurate aggregations yet not see unauthorized data.

The following detailed description and accompanying drawings provide a better understanding of the nature and advantages of the present invention.

DETAILED DESCRIPTION

Described herein are techniques for securing and authorizing multidimensional transactional data. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described below is what is referred to as the "new paradigm". According to the new paradigm, the user can distinguish between whether a data set is not booked (no revenue, "---" or other arbitrary symbol) or not authorized (may be also not booked but that must not be further distinguished). Unauthorized information may be indicated with a symbol such as "<NA>" (or another arbitrary sign indicating "no authorization").

Further according to the new paradigm, if the query selection selects for more values for 2-dimensional data (e.g., Customer and/or Material) where master data exists, the query still gives results, clearly distinguishing between authorized and non authorized values or booked and not booked values, respectively.

Further details regarding the new paradigm, including examples applying it to the example data and example report types discussed above, is provided below.

Figure 1:
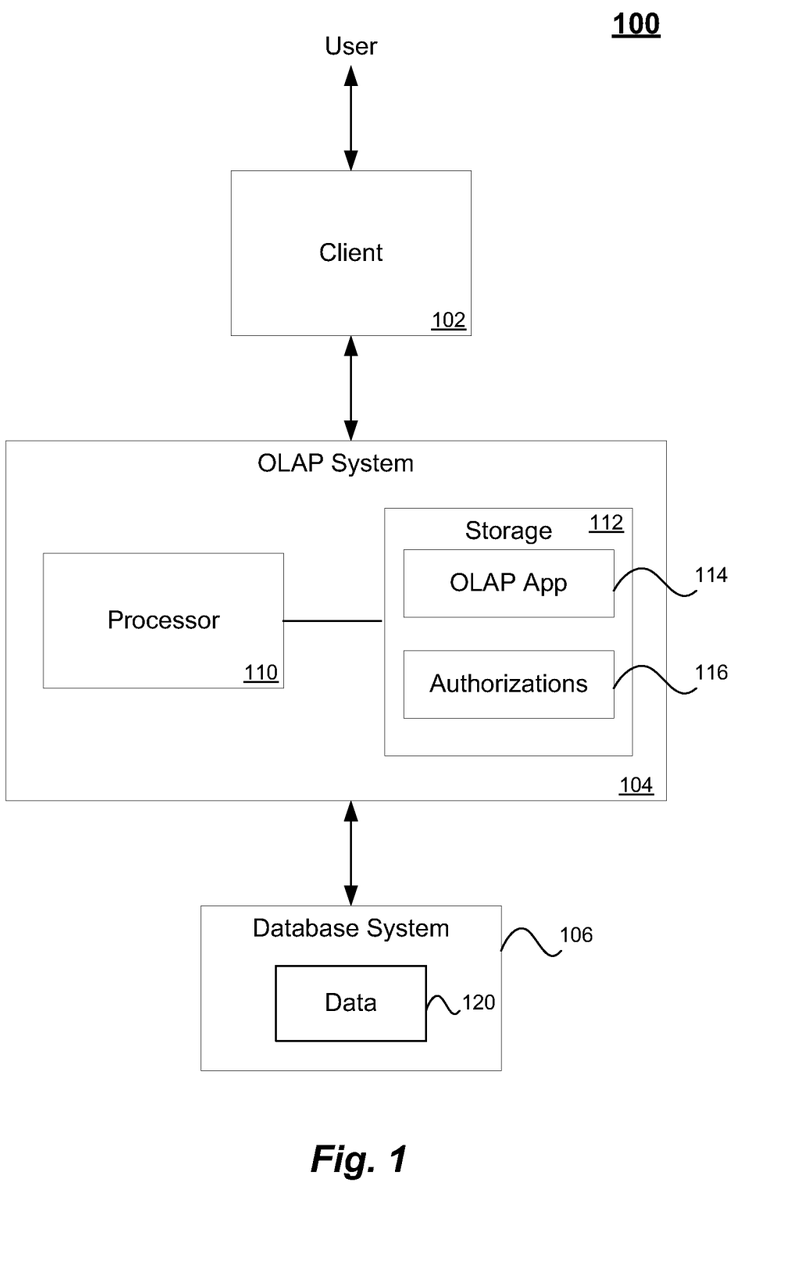
FIG. 1 is a block diagram of a system 100 according to an embodiment of the present invention.

FIG. 1 is a block diagram of a system 100 according to an embodiment of the present invention that implements the new paradigm. The system 100 is directed toward securing and authorizing access to multidimensional transactional data. The system 100 includes a client device 102, an OLAP system 104, and a database system 106. The system 100 may implement a three-tier client-server architecture. Each tier may include one or more physical computing devices. The client-server architecture may be the Java™ 2 Enterprise Edition (J2EE) environment or the Microsoft .NET™ environment. (Further specific hardware details of the system 100 are provided with reference to FIG. 3.)

The client device 102 implements the presentation tier. The presentation tier manages input and output for the user, including input of user queries or other informational requests, and output (display) of the results of the informational requests. The client device 102 interfaces with the OLAP system 104, for example though a computer network (not shown).

The OLAP system 104 implements the application tier. The application tier manages applications (e.g., computer programs). The OLAP system 104 includes a processor system 110 and a storage system 112. The storage system 112 may include a memory system and a disk system (not shown). The storage system 112 stores the OLAP applications 114 and authorization information 116. The OLAP applications 114 perform online analytical processing tasks according to embodiments of the present invention. The authorization information 116 defines the authorizations (access) allowed to the users. The processor 110 executes the OLAP applications 114 to control the OLAP system 104. The OLAP system 104 interfaces with the database system 106, for example through a computer network (not shown).

The database system 106 implements the database tier. The database tier manages data in a neutral fashion, independently of business logic (for example) implemented by the application tier. The database system 106 implements a database that stores multidimensional transactional data 120.

Figure 2:
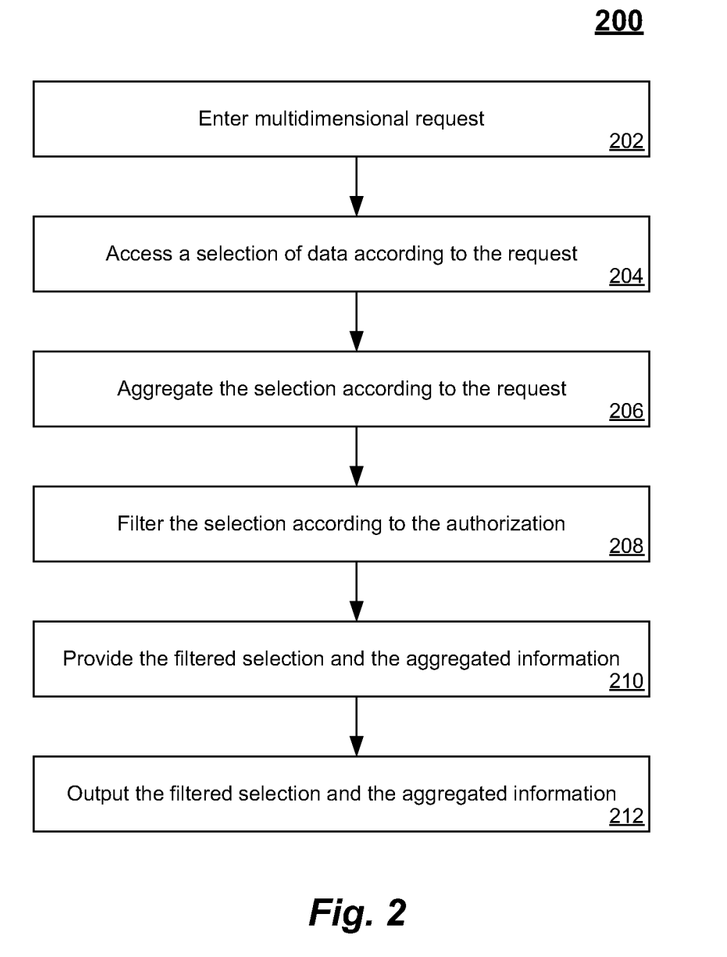
FIG. 2 is a flowchart of a method 200 of securing and authorizing access to multidimensional transactional data according to an embodiment of the present invention.

FIG. 2 is a flowchart of a method 200 of securing and authorizing access to multidimensional transactional data according to an embodiment of the present invention. The method 200 may be implemented by the OLAP applications 114 and performed by the system 100.

In step 202, the user enters a multidimensional request. The client 102 provides the multidimensional request to the OLAP system 104.

In step 204, the OLAP system 104 accesses a selection of the multidimensional transactional data from the database system 106 according to the multidimensional request. Note that the selection corresponds to the user's request without regard to the user's authorization.

In step 206, the OLAP system 104 aggregates the selection of the multidimensional transactional data according to the multidimensional request, to form aggregated information. The aggregated information may be, for example, sums or rollups of the data according to various master data (for specific examples see the reports below).

In step 208, the OLAP system 104 filters the selection of the multidimensional transactional data according to the authorization for the user, to form a filtered selection. The filtered selection includes the data the user is authorized to access. The filtered selection may also include indications that the user has requested unauthorized data. The filtered selection may also include indications that data is absent (that is, that if data were present the user would be authorized to view it, but in fact no data is present). Specific examples that illustrate the filtering according to embodiments of the present invention are discussed below regarding the reports.

In step 210, the OLAP system 104 provides the filtered selection and the aggregated information to the client 102.

In step 212, the client 102 outputs the filtered selection and the aggregated information for the user.

Based on the above embodiments, a number of differences can be seen as compared to the filter paradigm and the barrier paradigm.

According to an embodiment discussed above, the aggregated information aggregates all of the selection regardless of the authorization of the user. In contrast, the filter paradigm or the barrier paradigm aggregate only over authorized information.

According to an embodiment discussed above, the filtered selection differentiates between authorized data, unauthorized data and absent data according to the authorization of the user. In contrast, the filter paradigm or the barrier paradigm do not indicate regarding a particular piece of missing data whether it is missing because the user is unauthorized to see it or whether it is missing because there is no actual underlying data.

According to an embodiment discussed above, for a query entered by two different users (with two different authorizations), the aggregated information for both users will match, even if the filtered selections differ between the users (because of their different authorizations). In contrast, the filter paradigm or the barrier paradigm may display different aggregated information when the authorizations differ.

The OLAP system 100 or the method 200 may be used to generate reports that provide more information to users than the reports generated according to the filter paradigm or the barrier paradigm discussed above. These reports are discussed below to illustrate specific examples according to embodiments of the present invention.

As discussed above, the first report type is a table-like drilldown of Customer and Material. Using the data from TABLE 1 and the authorizations from TABLE 2, the OLAP system 100 or the method 200 may generate the report of TABLE 9:

TABLE 9

| Customer | Material | Revenue |
| --- | --- | --- |
| Aron | Antibiotic | 100$ |
|  | Brush | — |
|  | Desk | <NA> |
|  | Table | <NA> |
| Sum |  | <NA> |
| Bush | Antibiotic | 50$ |
|  | Brush | 20$ |
|  | Desk | <NA> |
|  | Table | <NA> |
| Sum |  | <NA> |
| Decker | Antibiotic | — |
|  | Brush | 200$ |
|  | Desk | <NA> |
|  | Table | <NA> |
| Sum |  | <NA> |
| Miller | Antibiotic | <NA> |
|  | Brush | <NA> |
|  | Desk | 400$ |
|  | Table | — |
| Sum |  | <NA> |
| Norman | Antibiotic | <NA> |
|  | Brush | <NA> |
|  | Desk | 500$ |
|  | Table | 200$ |
| Sum |  | <NA> |
| Total |  | <NA> |

Comparing the new paradigm (TABLE 9) to the filter paradigm (TABLE 4), note how it is easy to differentiate between revenue information that is authorized and has not been booked ("---") versus revenue information that has not been authorized ("<NA>").

As discussed above, the second report type is an x-y report of Customer and Material. Using the data from TABLE 1 and the authorizations from TABLE 2, the OLAP system 100 or the method 200 may generate the report of TABLE 10:

TABLE 10

|  | Customer | | | | | |
|---|---|---|---|---|---|---|
| Material | Aron | Bush | Decker | Miller | Norman | SUM |
| Antibiotic | 100$ | 50$ | — | <NA> | <NA> | <NA> |
| Brush | — | 20$ | 200$ | <NA> | <NA> | <NA> |
| Desk | <NA> | <NA> | <NA> | 400$ | 500$ | <NA> |
| Table | <NA> | <NA> | <NA> | — | 200$ | <NA> |
| SUM | <NA> | <NA> | <NA> | <NA> | <NA> | <NA> |

Comparing the new paradigm (TABLE 10) to the filter paradigm (TABLE 6), note how it is easy to differentiate between revenue information that is authorized and has not been booked ("---") versus revenue information that has not been authorized ("<NA>").

As can be seen in TABLE 9 and TABLE 10, one noteworthy feature of the new paradigm is that the numbers are not user dependent and there is no barrier, so some data is always displayed without any further restrictions in the query selection.

Before discussing the third type of report, we will introduce the label "new paradigm (version a)" to refer to the new paradigm as discussed regarding TABLES 9-11, and the label "new paradigm (version b)" to refer to a modified version of the new paradigm as discussed regarding TABLES 12-13. Regarding other sections (e.g., FIG. 1, FIG. 2, summary, etc.), the term "new paradigm" should be understood to refer to either, or both, of version a and version b according to the context.

As discussed above, the third type of report includes only Customer in Drilldown with an aggregation (sum) over Material. Using the data from TABLE 1 and the authorizations from TABLE 2, the OLAP system 100 or the method 200 may generate the report of TABLE 11 according to the new paradigm (version a):

TABLE 11

| Customer | Revenue |
|---|---|
| Aron | <NA> |
| Bush | <NA> |
| Decker | <NA> |
| Miller | <NA> |
| Norman | <NA> |
| SUM | <NA> |

Note that the new paradigm (version a) may not show all the numbers depending upon the authorizations (and in the example of TABLE 11 shows none), but gives still a possibility to receive consistent data by allowing the user to drill down to Material. (Such a drilldown for a particular Customer results in seeing the information for that Customer, for example, appearing as a column from TABLE 10.) And, still the Customers are shown in case there is any authorization for them. Therefore, the user sees all Names (and analogously sees all Materials). The masking indicates to the end user that, due to authorizations, he will not see consistent revenues and that he must change the drilldown. And, in contrast to the barrier paradigm he will still get a useful result (since the barrier paradigm does not even return the master data for Customer or Material; it only returns "not authorized").

Thus, the new paradigm (version a) may not in all cases display useful data, until the user drills down. One challenge with the new paradigm (version a) appears with having a couple of dimensions not in the drill down. A dimension that is not drilled down is aggregated (e.g. summed). Now, with the new paradigm (version a) it may happen that too many displayed values are masked out (as in TABLE 11). In practice this may lead to a similar behavior as in the filter paradigm, where selections are displayed only when everything is allowed: One would see (almost) nothing or just <NA> signs, like above in TABLE 11.

The new paradigm (version b) provides a solution to this dilemma. The new paradigm (version b) does not derive sums as a sum of the allowed values and mask them out (unless all contributors are authorized), but instead always defines the sum as a sum over all values that are booked. According to a further embodiment, the user may be prevented from seeing the sum by using an aggregation authorization.

Assuming that all "aggregation authorizations" are granted, all sums are visible and the second report looks like TABLE 12 under the new paradigm (version b):

TABLE 12

|  | Customer | | | | | |
|---|---|---|---|---|---|---|
| Material | Aron | Bush | Decker | Miller | Norman | SUM |
| Antibiotic | 100$ | 50$ | — | <NA> | <NA> | 150$ |
| Brush | — | 20$ | 200$ | <NA> | <NA> | 220$ |
| Desk | <NA> | <NA> | <NA> | 400$ | 500$ | 1356$ |
| Table | <NA> | <NA> | <NA> | — | 200$ | 323$ |
| SUM | 679$ | 70$ | 200$ | 400$ | 700$ | 2049$ |

Thus, for the second report, the new paradigm (version a) results in TABLE 10, and the new paradigm (version b) results in TABLE 12. TABLE 12 thus presents a view that is not possible using either the filter paradigm or the barrier paradigm. Note that the displayed sum is the sum of all "booked" amounts regardless of authorization. Thus, the sums are accurate (compare to TABLE 3) as well as consistent between users regardless of authorization (assuming all aggregation authorizations are granted).

(The fact that all numbers that are masked out can be derived by reverse engineering is due to the few numbers and the fact that all aggregation authorization are granted. In practice the data set will be large enough, and not all aggregation authorizations are granted, so that reverse engineering will be generally impracticable.)

Finally, applying the new paradigm (version b) to the third type of report results in a report that looks like TABLE 13:

TABLE 13

| Customer | Revenue |
|---|---|
| Aron | 679$ (Really all materials, not just the authed ones in case the user has aggregation authorization) |
| Bush | 70$ |
| Decker | 200$ |
| Miller | 400$ |
| Norman | 700$ |
| SUM | 2049$ |

In comparing TABLE 13 to TABLE 8 (filter paradigm), note that Aron/Revenue is accurately shown as 679$ (compare to the underlying data in TABLE 1 or TABLE 7 showing all authorizations).

In summary, the new paradigm allows the user to get the benefits of a filter mechanism yet see consistent data that is not user dependent: A number is displayed or not, but also complicated selections can be avoided. The system does it automatically in the process of aggregation.

Views like TABLE 12 become possible only with the new paradigm. It is possible to hide the information whether something is booked or not. "Not booked" is like a booking of 0$ and should be protectable without getting inconsistent views (as would occur with the filter paradigm) or even "no authorization" (as would occur with the barrier paradigm).

Figure 3:
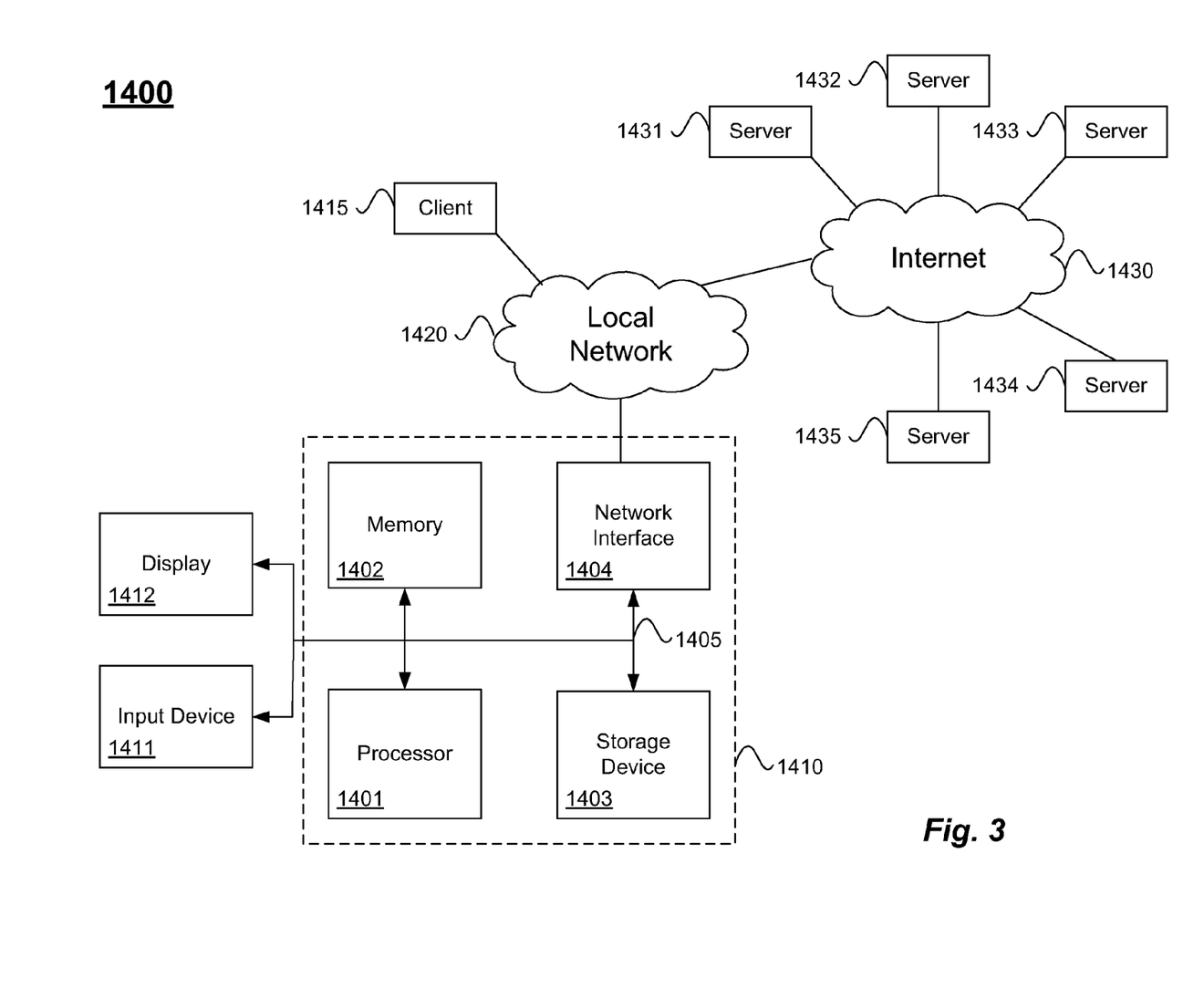
FIG. 3 is a block diagram of an example computer system and network 1400 for implementing embodiments of the present invention.

FIG. 3 is a block diagram of an example computer system and network 1400 for implementing embodiments of the present invention. Computer system 1410 includes a bus 1405 or other communication mechanism for communicating information, and a processor 1401 coupled with bus 1405 for processing information. Computer system 1410 also includes a memory 1402 coupled to bus 1405 for storing information and instructions to be executed by processor 1401, including information and instructions for performing the techniques described above. This memory may also be used for storing temporary variables or other intermediate information during execution of instructions to be executed by processor 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1403 may include source code, binary code, or software files for performing the techniques or embodying the constructs above, for example.

Computer system 1410 may be coupled via bus 1405 to a display 1412, such as a cathode ray tube (CRT) or liquid crystal display (LCD), for displaying information to a computer user. An input device 1411 such as a keyboard and/or mouse is coupled to bus 1405 for communicating information and command selections from the user to processor 1401. The combination of these components allows the user to communicate with the system. In some systems, bus 1405 may be divided into multiple specialized buses.

Computer system 1410 also includes a network interface 1404 coupled with bus 1405. Network interface 1404 may provide two-way data communication between computer system 1410 and the local network 1420. The network interface 1404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1404 sends and receives electrical, electromagnetic, or optical signals that carry digital data streams representing various types of information.

Computer system 1410 can send and receive information, including messages or other interface actions, through the network interface 1404 to an Intranet or the Internet 1430. In the Internet example, software components or services may reside on multiple different computer systems 1410 or servers 1431, 1432, 1433, 1434 and 1435 across the network. A server 1431 may transmit actions or messages from one component, through Internet 1430, local network 1420, and network interface 1404 to a component on computer system 1410.

The computer system and network 1400 may be configured in a client server manner. The client 1415 may include components similar to those of the computer system 1410.

More specifically, the client 1415 may implement the client 102 (see FIG. 1). The computer system 1410 may implement the OLAP system 104 (see FIG. 1). The server 1431 may implement the database system 106 (see FIG. 1).

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A system for securing and authorizing access to multidimensional transactional data, comprising:
    an online analytical processing (OLAP) system that implements an OLAP application computer program for accessing the multidimensional transactional data, the OLAP system including:
        a storage system that stores authorization information, wherein the authorization information defines an authorization for a user, and
        a processor system that executes the OLAP application computer program; and
    a database system that implements a database that stores the multidimensional transactional data,
    wherein the OLAP application computer program controls the OLAP system to execute processing including:
        accessing a selection of the multidimensional transactional data from the database system according to a multidimensional request from the user,
        aggregating the selection of the multidimensional transactional data according to the multidimensional request, to form aggregated information,
        filtering the selection of the multidimensional transactional data according to the authorization for the user, to form a filtered selection, wherein the selection consists of the filtered selection and data omitted from the filtered selection, wherein an aggregation of the filtered selection differs from the aggregation information, and wherein the filtered selection differentiates between authorized data, unauthorized data, and absent data according to the authorization of the user, and
        providing to the user the filtered selection, an indicator for the data omitted from the filtered selection, and the aggregated information.

2. The system of claim 1, wherein the aggregated information aggregates all of the selection regardless of the authorization of the user.

3. The system of claim 1, wherein:
    the user is a first user, the authorization is a first authorization, the filtered selection is a first filtered selection, and the aggregated information is first aggregated information;
    a second user has a second authorization, wherein the second authorization provides different authorizations from the first authorization;
    a second filtered selection results from filtering the selection of the multidimensional transactional data according to the second authorization;
    second aggregated information results from aggregating the selection according to the multidimensional request from the second user; and the first filtered selection differs from the second filtered selection, and the first aggregated information matches the second aggregated information.

4. The system of claim 1, wherein the multidimensional transactional data is two dimensional transactional data, wherein the two dimensional transactional data includes a first plurality of master data and a second plurality of master data, and wherein an element of transactional data in the two dimensional transactional data is associated with one of the first plurality of master data and one of the second plurality of master data.

5. The system of claim 1, wherein the multidimensional transactional data is two dimensional transactional data, wherein the two dimensional transactional data includes a first plurality of master data and a second plurality of master data, wherein the authorization information indicates a first subset of the first plurality of master data and a second subset of the second plurality of master data.

6. A computer-implemented method of securing and authorizing access to multidimensional transactional data, comprising:
   accessing a selection of multidimensional transactional data according to a multidimensional request;
   aggregating the selection of the multidimensional transactional data according to the multidimensional request, to form aggregated information;
   filtering the selection of the multidimensional transactional data according to an authorization for a user, to form a filtered selection, wherein the selection consists of the filtered selection and data omitted from the filtered selection, wherein an aggregation of the filtered selection differs from the aggregation information, and wherein the filtered selection differentiates between authorized data, unauthorized data, and absent data according to the authorization of the user, and
   outputting the filtered selection, an indicator for the data omitted from the filtered selection, and the aggregated information.

7. The method of claim 6, wherein the aggregated information aggregates all of the selection regardless of the authorization of the user.

8. The method of claim 6, wherein:
   the user is a first user, the authorization is a first authorization, the filtered selection is a first filtered selection, and the aggregated information is first aggregated information;
   a second user has a second authorization, wherein the second authorization provides different authorizations from the first authorization;
   a second filtered selection results from filtering the selection of the multidimensional transactional data according to the second authorization;
   second aggregated information results from aggregating the selection according to the multidimensional request from the second user; and
   the first filtered selection differs from the second filtered selection, and the first aggregated information matches the second aggregated information.

9. The method of claim 6, wherein the multidimensional transactional data is two dimensional transactional data, wherein the two dimensional transactional data includes a first plurality of master data and a second plurality of master data, and wherein an element of transactional data in the two dimensional transactional data is associated with one of the first plurality of master data and one of the second plurality of master data.

10. The method of claim 6, wherein the multidimensional transactional data is two dimensional transactional data, wherein the two dimensional transactional data includes a first plurality of master data and a second plurality of master data, wherein the authorization information indicates a first subset of the first plurality of master data and a second subset of the second plurality of master data.

11. A computer program embodied on a non-transitory tangible recording medium for securing and authorizing access to multidimensional transactional data, comprising:
   a first computer program that controls a computer system to access a selection of multidimensional transactional data according to a multidimensional request;
   a second computer program that controls the computer system to aggregate the selection of the multidimensional transactional data according to the multidimensional request, to form aggregated information;
   a third computer program that controls the computer system to filter the selection of the multidimensional transactional data according to an authorization for a user, to form a filtered selection, wherein the selection consists of the filtered selection and data omitted from the filtered selection, and wherein an aggregation of the filtered selection differs from the aggregation information, and wherein the filtered selection differentiates between authorized data, unauthorized data, and absent data according to the authorization of the user; and
   a fourth computer program that controls the computer system to output the filtered selection, an indicator for the data omitted from the filtered selection, and the aggregated information.

12. The computer program of claim 11, wherein the aggregated information aggregates all of the selection regardless of the authorization of the user.

13. The computer program of claim 11, wherein:
   the user is a first user, the authorization is a first authorization, the filtered selection is a first filtered selection, and the aggregated information is first aggregated information;
   a second user has a second authorization, wherein the second authorization provides different authorizations from the first authorization;
   a second filtered selection results from filtering the selection of the multidimensional transactional data according to the second authorization;
   second aggregated information results from aggregating the selection according to the multidimensional request from the second user; and
   the first filtered selection differs from the second filtered selection, and the first aggregated information matches the second aggregated information.

14. The computer program of claim 11, wherein the multidimensional transactional data is two dimensional transactional data, wherein the two dimensional transactional data includes a first plurality of master data and a second plurality of master data, and wherein an element of transactional data in the two dimensional transactional data is associated with one of the first plurality of master data and one of the second plurality of master data.

15. The computer program of claim 11, wherein the multidimensional transactional data is two dimensional transactional data, wherein the two dimensional transactional data includes a first plurality of master data and a second plurality of master data, wherein the authorization information indicates a first subset of the first plurality of master data and a second subset of the second plurality of master data.

\* \* \* \* \*